(12) United States Patent
Turko et al.

(10) Patent No.: US 9,610,644 B2
(45) Date of Patent: Apr. 4, 2017

(54) MATE FACE BRAZING FOR TURBINE COMPONENTS

(75) Inventors: Andy Turko, Southington, CT (US); Tracy A. Propheter-Hinckley, Manchester, CT (US)

(73) Assignee: United Technologies Corporation, Farmington, CT (US)

( * ) Notice: Subject to any disclaimer, the term of this patent is extended or adjusted under 35 U.S.C. 154(b) by 1575 days.

(21) Appl. No.: 13/022,641

(22) Filed: Feb. 8, 2011

(65) Prior Publication Data

US 2012/0201684 A1   Aug. 9, 2012

(51) Int. Cl.
*F01D 9/04* (2006.01)
*B23K 1/00* (2006.01)
*B23K 101/00* (2006.01)

(52) U.S. Cl.
CPC ............ *B23K 1/0018* (2013.01); *F01D 9/044* (2013.01); *B23K 2201/001* (2013.01); *F05D 2230/237* (2013.01); *Y10T 29/49229* (2015.01)

(58) Field of Classification Search
CPC . B23K 1/0018; B23K 2201/001; F01D 9/044; Y10T 29/49229; F05D 2230/237
See application file for complete search history.

(56) References Cited

U.S. PATENT DOCUMENTS

| 1,554,614 | A | * | 9/1925 | Allen | 416/190 |
| 5,174,715 | A | * | 12/1992 | Martin | 415/209.4 |
| 5,261,790 | A | * | 11/1993 | Dietz et al. | 416/193 A |
| 6,330,304 | B1 | * | 12/2001 | Warburton | 378/131 |
| 2008/0017696 | A1 | | 1/2008 | Urech et al. | |
| 2008/0063521 | A1 | | 3/2008 | Bogue et al. | |
| 2012/0128482 | A1 | * | 5/2012 | Dezouche et al. | 415/209.2 |

FOREIGN PATENT DOCUMENTS

| JP | H06336902 A | 12/1994 |
| JP | 2005305492 A | 11/2005 |

OTHER PUBLICATIONS

European Search Report for European Patent Application No. 12154079.3 completed Aug. 26, 2013.

* cited by examiner

*Primary Examiner* — John K Fristoe, Jr.
*Assistant Examiner* — Jeffrey A Brownson
(74) *Attorney, Agent, or Firm* — Carlson, Gaskey & Olds, PC

(57) ABSTRACT

A turbine component is formed of at least a plurality of adjacent turbine subcomponents. Each turbine component has a mate face secured to the mate face of an opposed turbine subcomponent. A wedge member is positioned between the mate faces of the turbine subcomponents, and a braze material between outer faces of the wedge and the mate faces of each of the turbine subcomponents.

22 Claims, 3 Drawing Sheets

MATE FACE BRAZING FOR TURBINE COMPONENTS

BACKGROUND

This application relates to a method of facilitating the brazing of mate faces between adjacent turbine components.

Gas turbine engines are known and typically include a compressor which compresses air and delivers it into a combustion chamber. The air is mixed with fuel and combusted in the combustion chamber. Products of this combustion pass downstream over turbine rotors.

Controlling the flow of the products of combustion is important to provide the most efficient operation in the gas turbine engine. Thus, vanes are positioned in the flow path to direct and control the gases as they approach turbine rotors. One known type of vane arrangement includes a plurality of vanes which are attached to circumferentially adjacent vanes to form a full ring. While welding has been utilized to secure the adjacent vanes, welding is typically labor intensive.

Thus, it is known to braze the adjacent vanes together. However, due to the build-up of the tolerance across the plurality of adjacent structures, it has sometimes been difficult to properly position the vanes with a brazing technique.

SUMMARY

A turbine component is formed of at least a plurality of adjacent turbine subcomponents. Each turbine component has a mate face secured to the mate face of an opposed turbine subcomponent. A wedge member is positioned between the mate faces of the turbine subcomponents, and a braze material is between outer faces of the wedge and the mate faces of each of the turbine subcomponents.

These and other features of the present invention can be best understood from the following specification and drawings, the following of which is a brief description.

DETAILED DESCRIPTION

Figure 1:
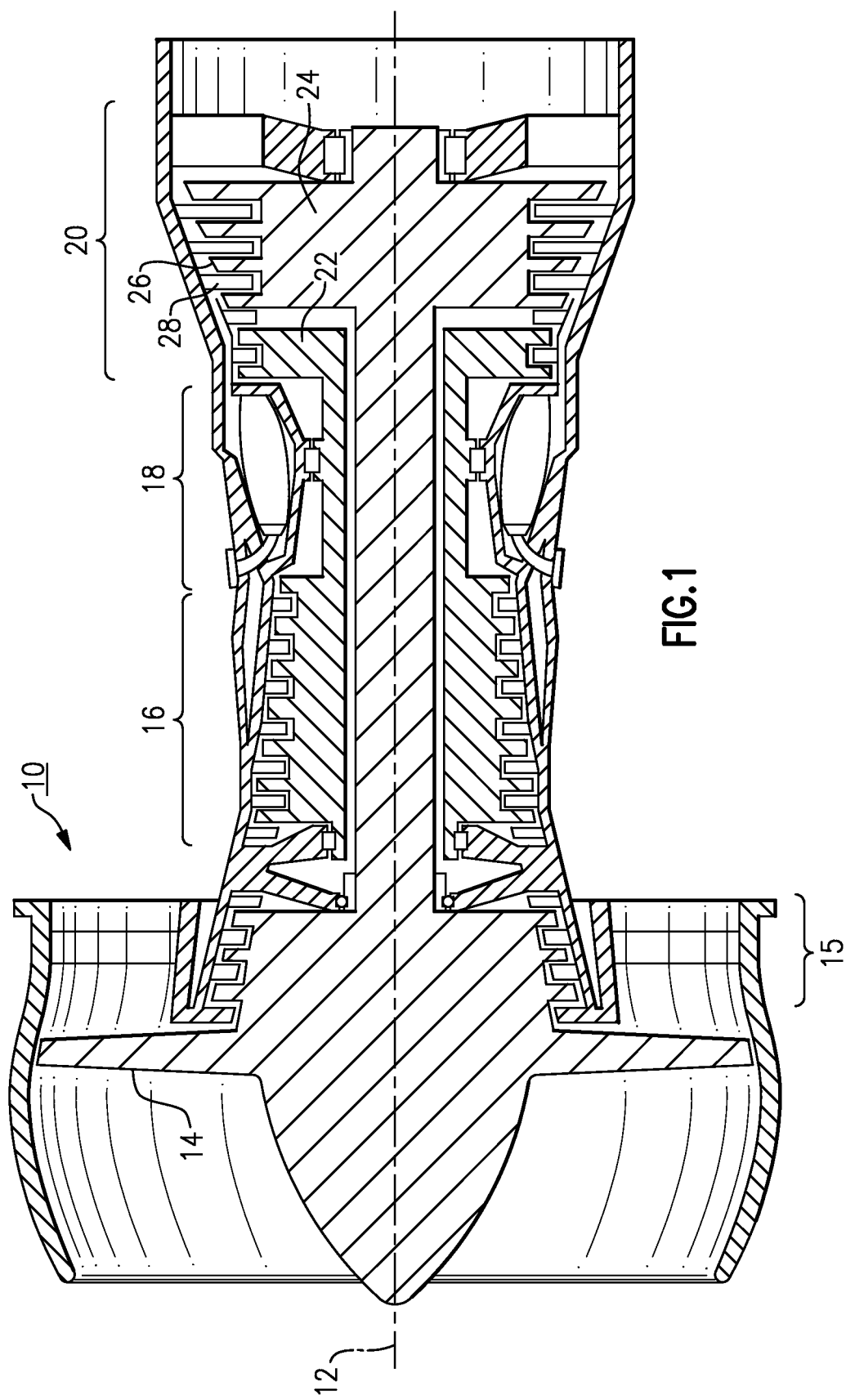
FIG. 1 shows a schematic of a gas turbine engine.

A gas turbine engine 10, such as a turbofan gas turbine engine, circumferentially disposed about an engine centerline, or axial centerline axis 12 is shown in FIG. 1. The engine 10 includes a fan 14, compressor sections 15 and 16, a combustion section 18 and a turbine 20. As is well known in the art, air compressed in the compressor 15/16 is mixed with fuel and burned in the combustion section 18 and expanded in turbine 20. The turbine 20 includes rotors 22 and 24, which rotate in response to the expansion. The turbine 20 comprises alternating rows of rotary airfoils or blades 26 and static airfoils or vanes 28. In fact, this view is quite schematic, and blades 26 and vanes 28 are actually removable. It should be understood that this view is included simply to provide a basic understanding of the sections in a gas turbine engine, and not to limit the invention. This invention extends to all types of turbine engines for all types of applications.

Figure 2A:
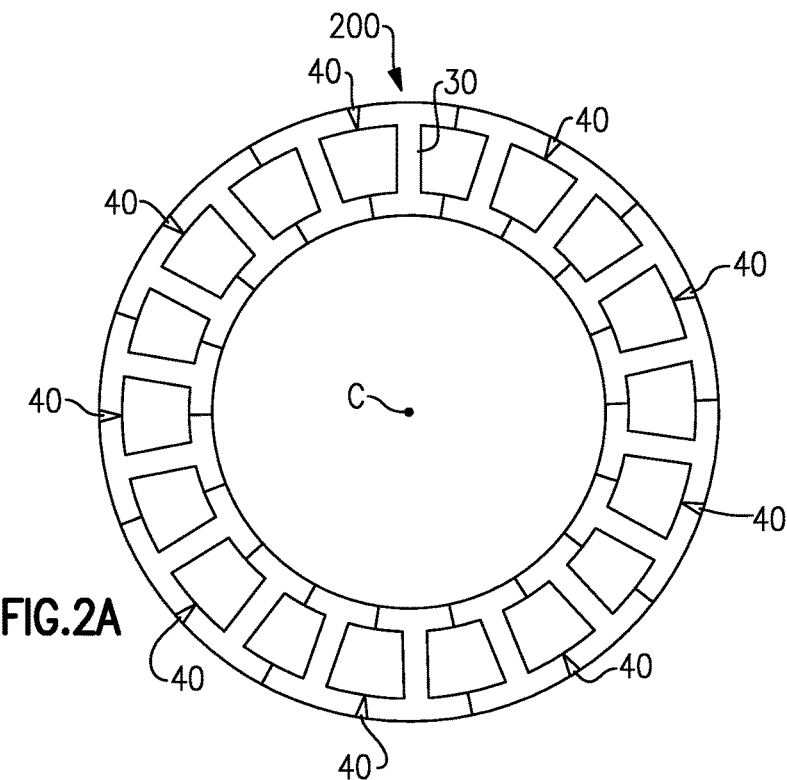
FIG. 2A schematically shows a full vane ring.

FIG. 2A shows a full vane ring 200, somewhat schematically that can provide the vane structure for vanes 28. As shown, a plurality of vane subcomponents 30 are secured together and centered about an axis C. The vanes 30 are secured together by brazing to the full vane ring 200. As shown, a plurality of wedges 40 are utilized between adjacent vanes 30. While the wedges 40 are shown only between select vane components 30, it should be understood that they could be utilized at each pair of adjacent vanes.

Figure 2B:
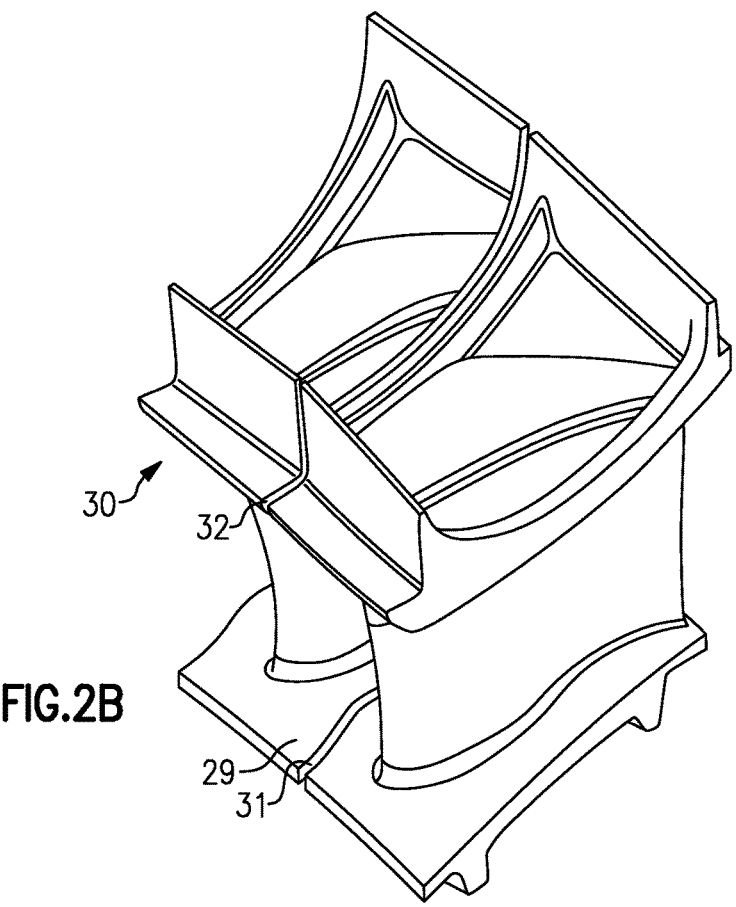
FIG. 2B shows two of the vane components.

FIG. 2B shows two vanes 30 along with a mate face 32 which is to receive a braze joint. While the mate face 32 is shown, it should be understood that a lower platform 29 also has a mate face 31 which may be secured by a brazing technique similar to that which will be described below.

Figure 3:
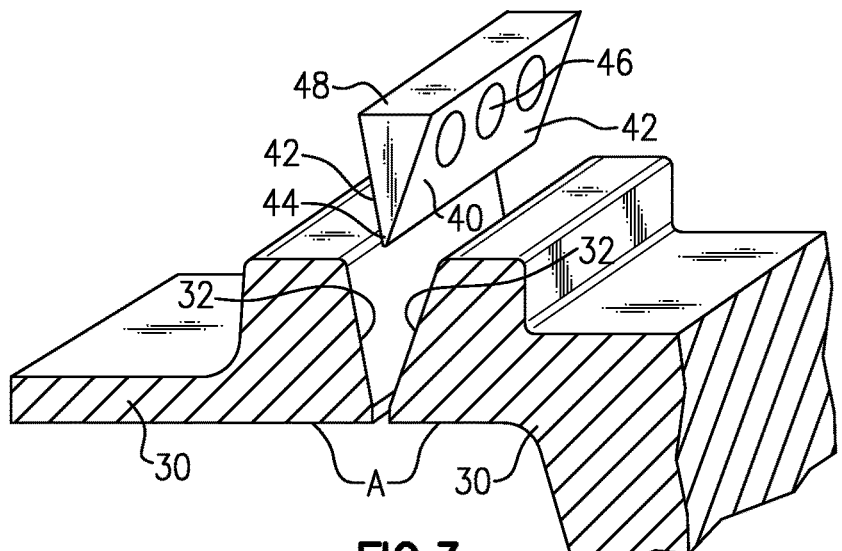
FIG. 3 shows a first step in brazing adjacent components together.

FIG. 3 shows a first step in the brazing operation. The vanes 30 are held in a fixture of some sort. A wedge member 40 has outer faces or sides 42 that taper downwardly toward a tip 44. While the wedge 40 is shown with a generally triangular cross-section, and straight faces 42, curved faces may also be utilized. In addition, while both sides of the wedge are shown to be tapered, in some applications only one of the faces need be tapered with the other extending generally radially inwardly. The wedge is formed to have a smaller dimension at the inner end 44 than at its outer end 48. As shown, holes 46 are formed along a length of the wedge member 40. These holes 46 will facilitate the flow of braze material, as is described below. Rather than holes, davits, troughs, or other surface features that facilitate the flow of braze material can be used. The sides 32 that form the mate faces on the vane components 30 also taper downwardly.

Figure 4:
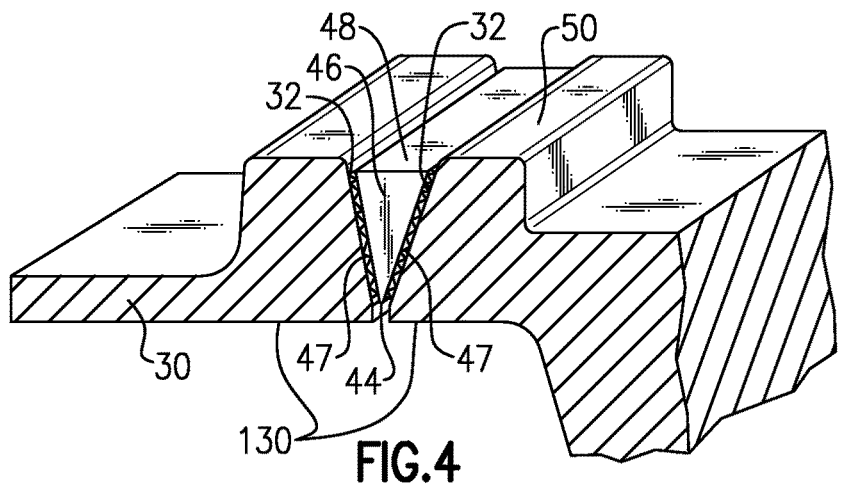
FIG. 4 shows a subsequent step.

As shown in FIG. 4, the wedge component 40 is positioned between the mate faces 32. Braze material 47 will eventually flow into the area between the wedge 40, faces 42 and the mate faces 32. The wedge 40 takes up clearance from a build-up of tolerances, and ensures a solid braze joint. As can be appreciated, since the wedge 40 tapers, and since the mate faces 32 are angled towards each other, they also taper. The wedge is able to move downwardly or radially inwardly, such that a close fit can be achieved.

Notably, as illustrated, the top end 48 of the wedge 40 does not extend radially outwardly as far as the top end 50 of the vane components in the area of the mate face 32. If the top end 48 is above ends 50, it gives assembly more ability to deal with the "slop" and provide a larger/stronger braze area. If end 48 is below ends 50, it is lighter and produces less windage in the plenum. The choice of above or below the ends would be a decision weighed for a specific part/engine.

In addition, as can be appreciated from FIG. 4, surfaces 130 define the boundary to a gas flow path. The tip 44 does not extend beyond the surfaces 130, and thus does not extend into the gas flow path in the disclosed embodiment.

Figure 5:
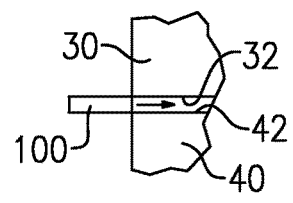
FIG. 5 shows yet another subsequent step.

FIG. 5 schematically shows the brazing operation. A braze material 100 is positioned adjacent one end of a vane member 30, and allows brazing material to flow into a gap between the mate face 32 and the faces 42 of the wedge 40. The holes 46 facilitate wicking and axial movement of the braze material such that a solid and secure connection is formed in a relatively short time.

The wedge may be formed of a material that is capable of withstanding high temperatures. Superalloy metals may be utilized. As an example, nickel or cobalt alloy materials may be utilized.

While a full vane ring is disclosed as being assembled with the brazing techniques of this application, other turbine components would benefit from similar techniques. The teachings of this application do extend to other turbine components, such as blades, etc., and also to components that are not necessarily "full ring."

Although embodiments of this invention have been disclosed, a worker of ordinary skill in this art would recognize that certain modifications would come within the scope of this invention. For that reason, the following claims should be studied to determine the true scope and content of this invention.

What is claimed is:

1. A turbine component comprising:
    a plurality of adjacent turbine subcomponents which each have a mate face secured to the mate face of an opposed turbine subcomponent; and
    a wedge member positioned between the mate faces of at least some of the turbine subcomponents, and a braze material between outer faces of the wedge and the mate faces of each of the at least some of the turbine subcomponents.

2. The turbine component as set forth in claim 1, wherein said wedge member has at least one face that tapers from an outer end toward an inner end such that said wedge member can move between the mate faces to provide a close fit.

3. The turbine component as set forth in claim 2, wherein at least one of said mate faces is also tapered.

4. The turbine component as set forth in claim 3, wherein said tapered mate face, and said tapered wedge member are both formed along straight angled faces.

5. The turbine component as set forth in claim 3, wherein said turbine subcomponents curve about a central axis, and the mate faces and the wedge member both taper from a radial outward end to a radially inward end.

6. The turbine component as set forth in claim 2, wherein both faces of the wedge member are tapered.

7. The turbine component as set forth in claim 1, wherein said turbine component is a full ring which extends about 360° around a central axis and said subcomponents are vanes.

8. The turbine component as set forth in claim 7, wherein a wedge is only positioned between some of said turbine subcomponents, with other turbine subcomponents in the turbine component being brazed together without a wedge.

9. The turbine component as set forth in claim 1, wherein a wedge is only positioned between some of said turbine subcomponents, with other turbine subcomponents in the turbine component being brazed together without a wedge.

10. The turbine component as set forth in claim 1, wherein said wedge is formed of one of nickel or cobalt alloy material.

11. The turbine component as set forth in claim 1, wherein said wedge extends along an axial dimension, and there being a plurality of surface features in said wedge member outer faces, the surface features facilitating the flow of braze material axially along the wedge.

12. The turbine component as set forth in claim 11, wherein said surface features are holes extending into the outer faces of the wedge member.

13. A method of forming a turbine component formed comprising the steps of:
    placing a pair of turbine subcomponents adjacent to each other such that a mate face on one faces a mate face of an opposed turbine subcomponent; and
    placing a wedge member between the mate faces of the turbine subcomponents, and moving braze material between outer faces of the wedge and the mate faces of each of the turbine subcomponents.

14. The method as set forth in claim 13, wherein said wedge member tapers from an outer end toward an inner end, and moving said wedge member between the adjacent mate faces to provide a close fit.

15. The method as set forth in claim 14, wherein said mate faces are also tapered.

16. The method as set forth in claim 15, wherein said turbine components curve about a central axis, and the mate face and the wedge both taper from a radial outward end to a radially inward end.

17. The method as set forth in claim 13, wherein a full ring of turbine subcomponents is formed which extends about 360° around a central axis.

18. The method as set forth in claim 17, wherein a wedge is only positioned between some of said turbine subcomponents, with other turbine subcomponents being brazed together without a wedge.

19. The method as set forth in claim 13, wherein said wedge extends along an axial dimension, and there being a plurality of surface features in said wedge member outer faces, the surface features facilitating the flow of braze material axially along the wedge.

20. The method as set forth in claim 19, wherein said surface features are holes extending into the outer faces of the wedge member.

21. The turbine component as set forth in claim 1, wherein said braze material connecting said wedge member to said turbine subcomponents.

22. The method as set forth in claim 13, wherein said braze material connecting said wedge member to the turbine subcomponents.

* * * * *